(12) United States Patent
Ohba

(10) Patent No.: US 7,658,402 B2
(45) Date of Patent: Feb. 9, 2010

(54) CURTAIN AIRBAG SYSTEM

(75) Inventor: Yoshihiro Ohba, Yokohama (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/138,691

(22) Filed: Jun. 13, 2008

(65) Prior Publication Data
US 2008/0309056 A1    Dec. 18, 2008

(30) Foreign Application Priority Data
Jun. 13, 2007    (JP) .............................. 2007-156093

(51) Int. Cl.
*B60R 21/16*    (2006.01)
(52) U.S. Cl. .................................... 280/730.2
(58) Field of Classification Search ............... 280/730.2, 280/736, 740
See application file for complete search history.

(56) References Cited

U.S. PATENT DOCUMENTS

| | | | |
|---|---|---|---|
| 6,527,296 B2 * | 3/2003 | Bakhsh et al. ............ | 280/730.2 |
| 6,962,364 B2 * | 11/2005 | Ju et al. .................... | 280/730.2 |
| 6,971,665 B2 * | 12/2005 | Tanaka ..................... | 280/729 |
| 7,077,426 B2 * | 7/2006 | Shaker et al. ............ | 280/730.2 |
| 7,380,819 B2 * | 6/2008 | Fricke et al. ............. | 280/736 |
| 7,481,454 B2 * | 1/2009 | Sunabashiri ............. | 280/740 |

FOREIGN PATENT DOCUMENTS

| | | |
|---|---|---|
| JP | 2002-370601 | 12/2002 |
| JP | 2003-063343 | 3/2003 |
| JP | 2003-327067 | 11/2003 |
| JP | 2004-268608 | 9/2004 |
| WO | 2007/058211 A1 | 5/2007 |
| WO | 2007/060874 A1 | 5/2007 |

* cited by examiner

*Primary Examiner*—Faye M. Fleming
(74) *Attorney, Agent, or Firm*—Brinks Hofer Gilson & Lione

(57) ABSTRACT

An airbag is disposed over almost the entire length along a roof side rail. The airbag comprises a duct formed with a gas introduction hole and a plurality of chambers communicating with the duct. The duct comprises a long first duct part and a short second duct part arranged with the gas introduction hole being provided therebetween. The inlet of a chamber closest to the gas introduction hole in the first duct part has a shape that becomes narrower gradually from the upper part toward the lower part. The passage width of the uppermost part of the inlet of the closest chamber is greater than the depth to the narrowest part thereof, and the passage width of the narrowest part is narrower than the passage width of the first duct part around the inlet thereof.

3 Claims, 3 Drawing Sheets

CURTAIN AIRBAG SYSTEM

CROSS REFERENCES TO RELATED APPLICATIONS

This application claims priority to Japanese Patent Application No. 2007-156093 filed on Jun. 13, 2007.

FIELD OF THE INVENTION

The present invention relates to a curtain airbag system that is configured so that an airbag is stored on a roof side rail of a vehicle and is deployed along a side door window and the like in case of emergency.

BACKGROUND OF THE INVENTION

A curtain airbag system is configured so that in an emergency event such as in a side collision, rollover, or the like, gas for deployment is introduced from an inflator into an airbag that is stored on a roof side rail. The airbag is deployed along a side door window and the like to protect the passengers' heads. A curtain airbag system of this type is disclosed, for example, in Japanese Patent Laid-Open No. 2004-268608.

In the case where a high-output inflator (i) is used for a curtain airbag system (m) of this type, as shown in FIG. 1, gas for deployment collects in the vicinity of the inlet of a chamber (c) near a gas ejection hole of a gas guide (g) connected to the inflator (i), and therefore the internal pressure of a duct (d) increases. Then, a gas attack (e.g. overpressure condition which may lead to "bursting") occurs in the duct (d), which makes it difficult for the gas for deployment to reach a front part (f) of the duct (d). Accordingly, the deployment of the front part of the airbag may be delayed, or the airbag may burst or rupture.

To avoid such an event, the conventional curtain airbag system (m), an inner tube (t) (or a reinforcing cloth) have been put in the duct (d) to adjust the shape and the like of an orifice (o) of the inner tube (t) provided at the inlet position of the chamber (c). By doing this, gas collection is restrained and thereby the internal pressure of duct (d) is reduced. Thereby, the gas attack is prevented from occurring to make it easy for the gas for deployment to reach the front part (f) of the duct (d) and thereby prevent the airbag from bursting.

However, if the inner tube (t) is put in the duct (d), the package size at the storage time of the curtain airbag system (m) increases, which may make the airbag system (m) incapable of being stored on the roof side rail of the vehicle. Also, if the inner tube (t) is put in the duct (d), the cost of the curtain airbag system (m) becomes high.

SUMMARY OF THE INVENTION

The present invention has been made to address the above problems, and accordingly an object thereof is to provide a curtain airbag system with an airbag that is resistant to bursting by improving the flat pattern shape of airbag without putting an inner tube (or a reinforcing cloth) in a duct.

To achieve the above object, the present invention provides a curtain airbag system in which an airbag is stored on a roof side rail of a vehicle in a folded state, and, in case of emergency, gas for deployment sent from an inflator is introduced through a gas introduction hole of the airbag to expandingly deploy the airbag. The airbag is disposed over almost the entire length in the vehicle front and rear directions along the roof side rail, and comprises a duct formed with the gas introduction hole and a plurality of chambers communicating with the duct. The duct comprises a long first duct part and a short second duct part arranged with the gas introduction hole being provided therebetween. The inlet of a chamber closest to the gas introduction hole in the first duct part has a shape that becomes narrower gradually from the upper part toward the lower part. The passage width ($\alpha$) of the uppermost part of the inlet of the closest chamber is greater than the depth ($\beta$) to the narrowest part of the inlet of the closest chamber. The passage width ($\gamma$) of the narrowest part is narrower than the passage width ($\delta$) of the first duct part around the inlet of the closest chamber.

It is preferable that the shape of the inlet of the closest chamber ranging from the first duct part to the narrowest part have a curved shape that is convex toward the upper part direction.

Also, it is preferable that regarding the radius of curvature of the curved shape, the radius of curvature ($r$) of a curve on the side close to the gas introduction hole be smaller than the radius of curvature ($R$) of a curve on the side distant from the gas introduction hole.

In at least one embodiment of the curtain airbag system of the present invention, by improving the flat pattern shape of airbag as described above, the internal pressure of the duct at the early stage of deployment is restricted to a pressure not higher than the burst limit value so that gas for deployment smoothly reaches a portion in the duct that is substantially spaced apart from a gas ejection hole of an inflator. Thereby, bag damage of airbag can be reduced, and the delay in deployment of airbag can be improved.

DETAILED DESCRIPTION OF THE PREFERRED EMBODIMENT

Figure 1:
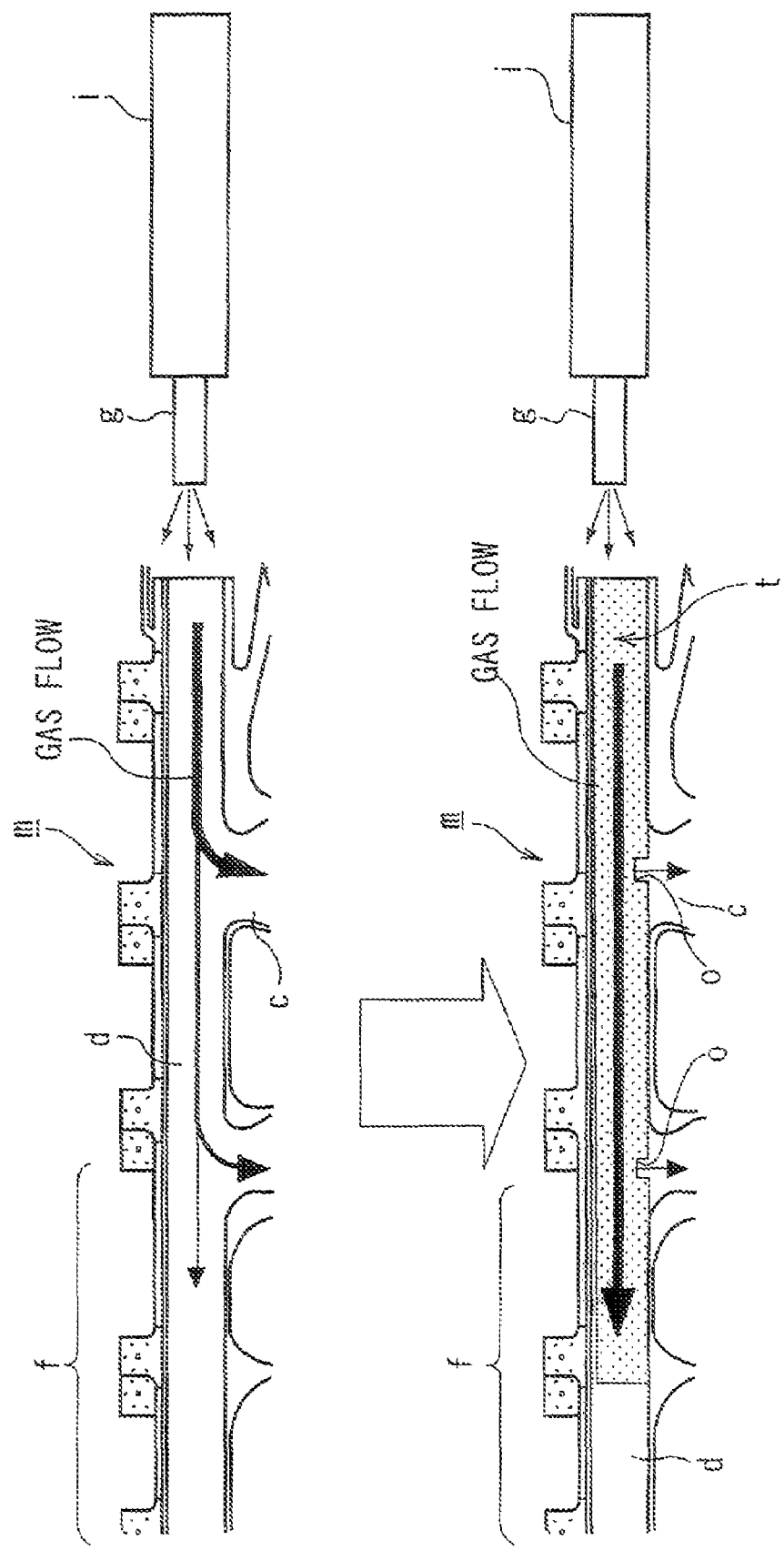
FIG. 1 is a front view of a portion of a conventional curtain airbag system for explaining the flow of gas for deployment therein.
Figure 2:
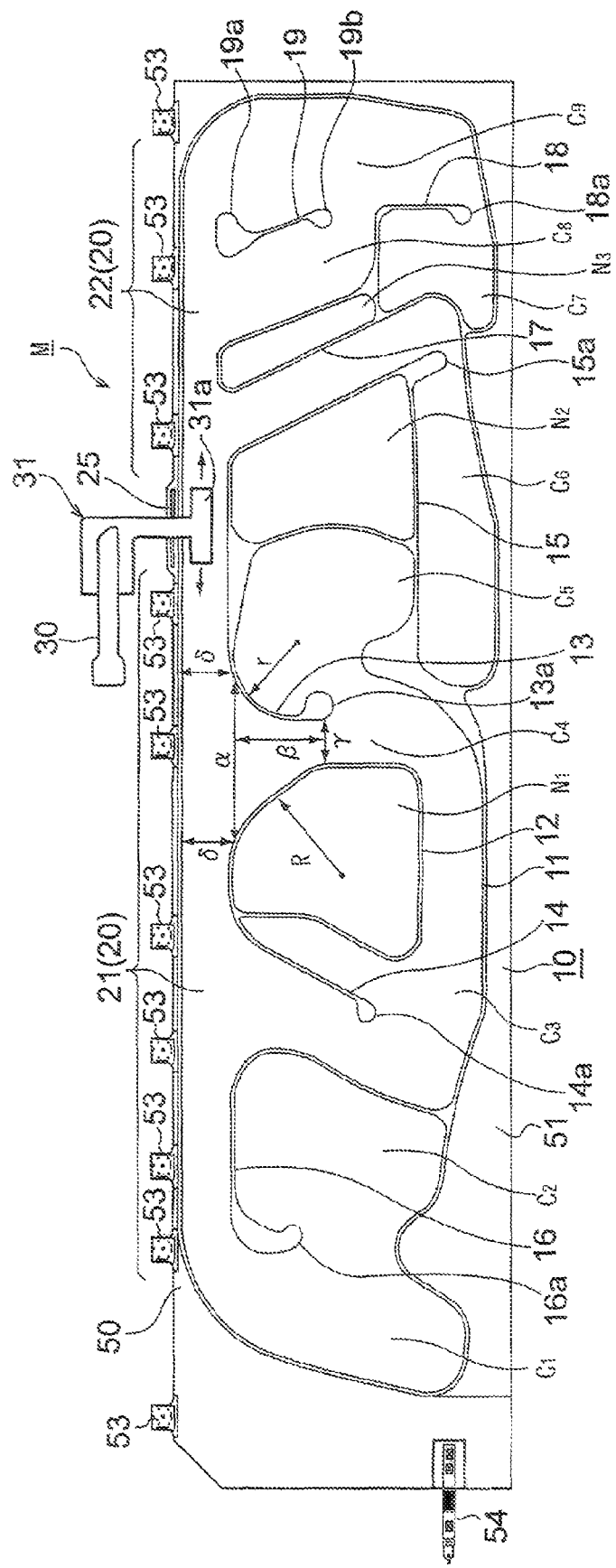
FIG. 2 is a front view of a curtain air bag system in accordance with an embodiment of the present invention.
Figure 3:
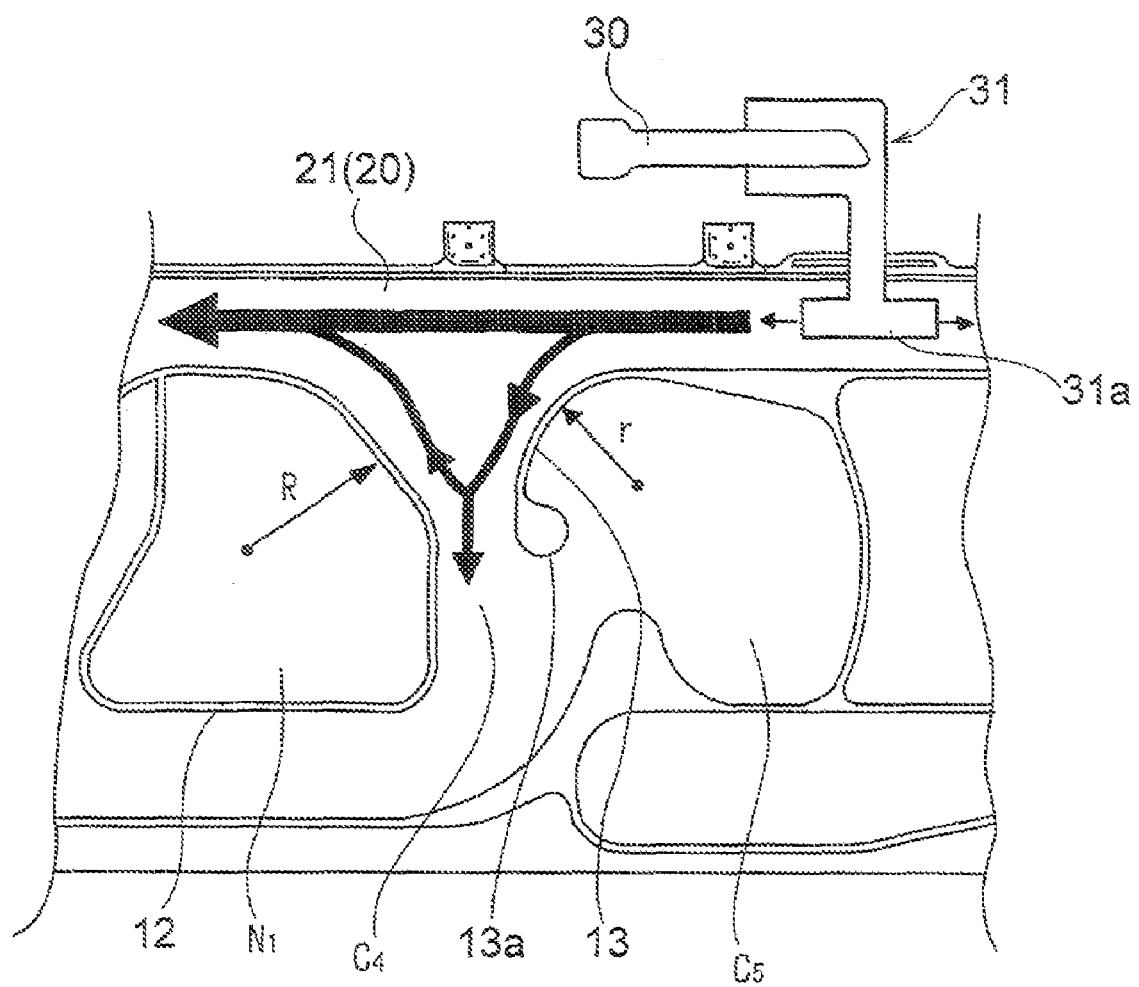
FIG. 3 is a front view of a portion of the curtain airbag system shown in FIG. 2 for explaining the flow of gas for deployment therein.

One example of an embodiment of the present invention will now be described in detail with reference to the accompanying drawings. FIG. 2 is a front view of a curtain air bag system in accordance with the embodiment of the present invention, and FIG. 3 is a front view of a portion of the curtain airbag system shown in FIG. 2 for explaining the flow of gas for deployment therein.

An airbag 10 of a curtain airbag system M is stored on a roof side rail of a vehicle in a folded state. The folded airbag 10 is disposed over almost the entire length in the vehicle front and rear directions along the roof side rail. In case of emergency, gas for deployment, which is sent from an inflator 30, is introduced through a gas introduction hole 25 of the airbag 10, and thereby the airbag 10 is expandingly deployed in a curtain form along the side surface of the vehicle. The airbag 10 is for receiving the heads of passengers seated on the front seat and the rear seat in the vehicle to protect them, or for restraining the passengers inside of the vehicle.

The airbag 10 is formed by lapping an inside sheet and an outside sheet that face the interior of vehicle compartment and the side surface of vehicle compartment, respectively, when the airbag 10 is fully deployed, and by connecting these sheets to each other by means of linear connection parts and annular connection parts. Thereby, there are formed a duct 20 disposed in the vehicle front and rear direction in the upper part of the airbag 10, a plurality of chambers $C_1$ to $C_9$ into which the gas for deployment is introduced downward from the duct 20, and non-expanding parts $N_1$ to $N_3$.

The gas introduction hole 25 is provided in an intermediate part of the duct 20. The duct 20 comprises a long first duct part 21 and a short second duct part 22 arranged with the gas introduction hole 25 being provided therebetween. In the example shown in FIG. 2, the first duct part 21 is located in the front of the vehicle, and the second duct part 22 is located on the rear of the vehicle.

The gas introduction hole 25 is connected with a gas guide 31. The gas guide 31 is connected with the inflator 30. The gas guide 31 has a branch tube 31a branching in the front and rear direction. The gas for deployment which is generated from the inflator 30 is distributed to the first duct part 21 and the second duct part 22 by the branch tube 31a.

The inlet of the chamber $C_4$, which is a chamber closest to the gas introduction hole 25 in the first duct part 21, has a shape that becomes narrower gradually from the upper part toward the lower part. The inlet of the chamber $C_4$ is formed by a substantially O-shaped linear connection part 12 and a substantially inverse J-shaped linear connection part 13. The end part of the linear connection part 13 connects with an annular connection part 13a. The annular connection part 13a reinforces the end part of the linear connection part 13.

A linear connection part 14 is provided so as to extend downward from the upper part of the linear connection part 12. The end part of the linear connection part 14 connects with an annular connection part 14a. The annular connection part 14a reinforces the end part of the linear connection part 14.

A substantially trapezoidal linear connection part 15 connects with the linear connection part 13. On the inside of the linear connection part 15, a non-expanding part $N_2$ is formed. The rear lower end part of the linear connection part 15 connects with an annular connection part 15a. The annular connection part 15a reinforces the rear lower end part of the linear connection part 15.

The linear connection part 12 and the linear connection part 13 are arranged so that the passage width ($\alpha$) of the uppermost part of the inlet of the closest chamber $C_4$ is greater than the depth ($\beta$) to the narrowest part of the inlet of the closest chamber $C_4$, and the passage width ($\gamma$) of the narrowest part is narrower than the passage width ($\delta$) of the first duct part 21 around the inlet of the closest chamber $C_4$.

The shapes of the linear connection part 12 and the linear connection part 13 at the inlet of the closest chamber $C_4$ ranging from the first duct part 21 to the narrowest part each have a curved shape that is convex toward the upper part direction. By doing this, stress concentration can be avoided, and thereby bag damage in this part is reduced.

Regarding the radius of curvature of the curved shape, the radius of curvature (r) of a curve on the side close to the gas introduction hole 25 (drawn by the linear connection part 13) is smaller than the radius of curvature (R) of a curve on the side distant from the gas introduction hole 25 (drawn by the linear connection part 12). By doing this, as shown in FIG. 3, gas collection in the narrowest part is restrained, the internal pressure of the first duct part 21 is reduced, and thus a gas attack can be restrained.

A linear connection part 11 is disposed so as to go around the airbag 10. The chamber $C_1$, which is arranged in the foremost part, is formed by the linear connection part 11 and a substantially "7"-shaped linear connection part 16. The end part of the linear connection part 16 connects with an annular connection part 16a. The annular connection part 16a reinforces the end part of the linear connection part 16.

The linear connection part 16 is provided so as to extend upward from the lower part of the linear connection part 11, and substantially has a "7"-shape. On the inside of the linear connection part 16, the chamber $C_2$ is formed. On the inside of the linear connection part 12, the non-expanding part $N_1$ is formed, and on the lower side thereof, the chamber $C_3$ is arranged.

The linear connection part 15 forms the chamber $C_5$ together with the linear connection part 13. On the lower side of the chamber $C_5$ and the non-expanding part $N_2$, the chamber $C_6$ is arranged.

Adjacent to the non-expanding part $N_2$, the non-expanding part $N_3$ is arranged. The non-expanding part $N_3$ is formed on the inside of a substantially trapezoidal linear connection part 17.

With the lower part of the linear connection part 17, an L-shaped linear connection part 18 connects. The end part of the linear connection part 18 connects with an annular connection part 18a. The annular connection part 18a reinforces the end part of the linear connection part 18. By the linear connection part 18 and the linear connection part 11, the chamber $C_7$ is formed.

Adjacent to the linear connection part 17, a linear connection part 19 is disposed. Both ends of the linear connection part 19 connect with annular connection parts 19a and 19b. Between the linear connection part 17 and the linear connection part 19, the chamber $C_8$ is formed. Also, by the linear connection part 19 and the linear connection part 11, the chamber $C_9$ is formed.

The linear connection parts 11 to 19 and the annular connection parts 13a to 16a, 18a, 19a and 19b connect the inside sheet and the outside sheet to each other in a substantially air-tight condition. These connection parts each are formed by a connecting means (for example, sewing by using a high-strength sewing thread, bonding by using an adhesive having a high adhesive strength, or welding) which is very strong such that the inside sheet and the outside sheet preferably do not separate from each other even if the internal pressure of the airbag 10 rises to the upper design pressure limit.

The linear connection part 11 is disposed so as to go around the airbag 10, and there are provided around the linear connection part 11 an upper peripheral edge part 50 and a lower peripheral edge part 51, into which the gas for deployment does not flow. On the upper edge side of the upper peripheral edge part 50, a plurality of attachment parts 53 for attaching the airbag 10 to the roof side rail are formed. On the front side of the lower peripheral edge part 51, a clamp 54 is fixed so that the airbag 10 is connected to a predetermined connection part (for example, the lower part of a front pillar) in the vehicle.

For the curtain airbag system M having the airbag 10 configured as described above, at the emergency time when a side collision or rollover is detected, the gas for deployment is introduced from the inflator 30 to the duct 20 via the branch tube 31a of the gas guide 31. The gas for deployment is introduced into the chambers $C_1$ to $C_5$ through the first duct part 21, and is introduced into the chambers $C_6$ to $C_9$ through the second duct part 22.

The airbag 10 spreads downward in a curtain form along the side surface of the vehicle, and expands between the passengers on the vehicle and the side surface of vehicle compartment. In case of emergency, the expansion of the chambers $C_1$ to $C_9$ prevents the passengers' heads from strongly striking the pillar or the side window.

The above-described curtain airbag system is a preferred example of the present invention. The present invention of other embodiments can be practiced or carried out by various methods. Unless otherwise specified in this specification, the present invention is not limited to the shape, size, configuration and arrangement, and the like of a specified part shown in the accompanying drawings. Also, the expression and terms used in this specification are used for explanation, and are not subject to special restrictions.

For example, as the curtain airbag used in the present invention, either of a bag in which the chamber is formed by OPW (One-Piece Woven) and a bag in which the chamber is formed by sewing a plurality of ground fabrics can be used

The invention claimed is:

1. An airbag for a curtain airbag system that is disposed over substantially the entire length of a roof side rail of a vehicle in the front and rear directions and stored on the roof side rail in the folded state, and being expandingly deployable with gas sent from an inflator which is introduced through a gas introduction hole of the airbag, the airbag comprising a duct formed with the gas introduction hole and a plurality of chambers communicating with the duct, the duct including a first duct part and a second duct part which is shorter than the first duct part, and the gas introduction hole being arranged between the first and second duct parts, wherein an inlet, which is closest to the gas introduction hole in the first duct part and is for one of the chambers, has a shape that becomes narrower gradually from an upper part toward a lower part, and a passage width of an uppermost part of the inlet of the closest chamber is greater than a depth to a narrowest part of the inlet of the closest chamber, and a passage width of the narrowest part is narrower than a passage width of the first duct part around the inlet of the closest chamber.

2. The airbag according to claim 1, wherein the inlet of the closest chamber ranging from the first duct part to the narrowest part has a curved shape that is convex facing toward the first duct part.

3. The airbag according to claim 2, wherein the curved shape has a radius of curvature of a curve on a side close to the gas introduction hole that is smaller than a radius of curvature of a curve on a side distant from the gas introduction hole.

* * * * *